MAGNETIC MEMORY

Filed June 29, 1962 2 Sheets-Sheet 1

INVENTORS
ROBERT F. ELFANT
KURT R. GREBE
BY [signature]
ATTORNEY

Nov. 29, 1966 R. F. ELFANT ETAL 3,289,179

MAGNETIC MEMORY

Filed June 29, 1962 2 Sheets-Sheet 2

United States Patent Office 3,289,179

Patented Nov. 29, 1966

3,289,179
MAGNETIC MEMORY

Robert F. Elfant, Yorktown Heights, and Kurt R. Grebe, Beacon, N.Y., assignors to International Business Machines Corporation, New York, N.Y., a corporation of New York Filed June 29, 1962, Ser. No. 206,356
11 Claims. (Cl. 340—174)

This invention relates to switching circuits and memory arrays and, more particularly, to an improved magnetic memory structure amenable to mass fabrication techniques and high capacity storage arrays.

Heretofore, magnetic memories have been proposed which comprise arrays of discrete magnetic storage elements, apertured plates and the like. These memories require that the discrete magnetic elements, or the plates, be individually fabricated and thereafter threaded with a plurality of conductors passing through the aperture of each element or each aperture of a plate. The manner of construction and mode of operation of such memories are well known. It is also well known that due to the required threading operation, the cost of fabrication of such arrays remains at a fixed level while the necessity of providing apertures of given size to accommodate the threading operation limits the maximum storage capacity of such memories.

A structure made in accordance with this invention not only provides an improved mode of memory operation but also provides a structure which is amenable to low cost fabrication techniques, miniaturization of overall size and, most important, allows construction of memories having a storage capacity which is greater, by at least an order of magnitude, than other conventional memories. All these features and others with respect to a fabrication method of this memory is disclosed in a copending application Serial No. 206,326, filed June 29, 1962 and now U.S. Patent No. 3,229,265, assigned to the assignee of this application.

Construction costs are lowered for such magnetic memories by providing a plurality of column conductors with a respective tubular core surrounding each column conductor made of magnetic material exhibiting a substantially rectangular hysteresis characteristic. Spaced along the length of each core is a plurality of portions each having a pair of oppositely disposed secondary apertures whose central axes are transverse with respect to the longitudinal axis of the core. A plurality of row conductors are provided each threaded through a respective pair of secondary apertures of each core. In a preferred embodiment of the memory, switching means are provided to selectively connect the row conductors to a utilization load during a first time interval and to a row selection and drive means during a second time interval in the operation of the memory in order to avoid the necessity of a separate sense conductor. A column address and drive means is provided to energize a selected one of the column conductors during the first time interval for establishing the core in a datum stable state of remanent flux orientation and to energize the same column conductor during the second time interval for applying a field to the core in opposition to the datum remanent state which is of insufficient magnitude, of and by itself, to cause a total irreversible flux change. The row selection and drive means are operative during the second time interval to energize at least one of the row conductors and to apply a magnetic field to said core about the threaded secondary apertures which is of insufficient magnitude, of and by itself, to cause an appreciable irreversible change in the datum remanent state of said core but is conjointly operative with the field applied by the energized column conductor to irreversibly switch the material of the core adjacent the secondary apertures of the core to a further stable state of remanent flux orientation.

The main feature of the structure here disclosed is that the row and column conductors be transverse with respect to another another and that coincident energization of both conductors operates to switch only that portion of the core coupled by the row conductor, that is, that portion of the core adjacent the secondary apertures.

Accordingly, it is a prime object of this invention to provide an improved magnetic memory.

A further object of this invention is to provide an improved switching circuit wherein a tubular magnetic core is provided with transverse conductors coupled thereto for storing information.

Still another object of this invention is to provide an improved magnetic core memory amenable to low cost fabrication techniques and high storage capacity.

The foregoing and other objects, features and advantages of the invention will be apparent from the following more particular description of preferred embodiments of the invention, as illustrated in the accompanying drawings.

In the figures:

FIG. 1*a* is a schematic of a magnetic storage device according to the invention.

FIGS. 1*b* and 1*c* illustrate alternate cross sections of a core structure shown in FIG. 1*a* according to different embodiments of this invention.

FIGS. 2*a* and 2*b* illustrates remanent flux patterns in the structure of FIG. 1*a* with the FIG. 2*b* being a developed view for ease of presentation.

Figure 1A:
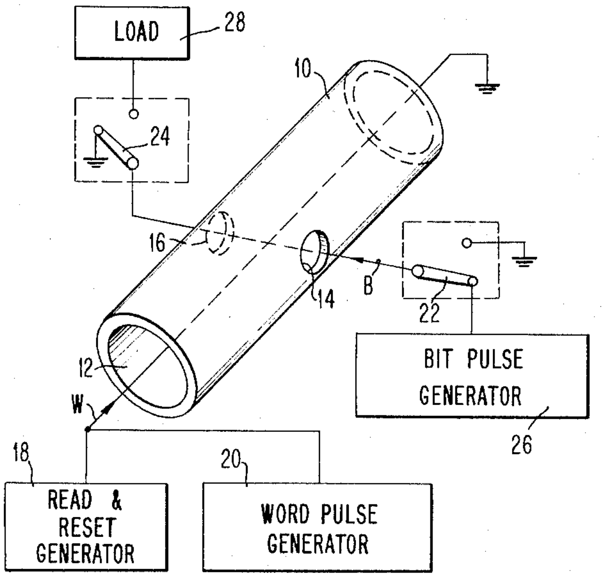
Figure 1B:
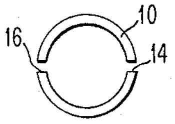
Figure 1C:
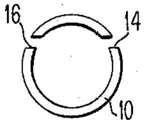

With reference to the FIGS. 1*a*, 1*b* and 1*c*, a schematic of the device of this invention is shown which comprises an elongated core 10 made of magnetic material which exhibits a substantially rectangular hysteresis characteristic. Such material is well known in the art and is characterized in that the hystersis loop has well defined knees which must be exceeded in order to cause an appreciable flux change and that there exists opposite stable states of flux remanence. The core 10 has a main aperture 12 and along the length of the core is a discrete portion having a pair of secondary apertures 14 and 16. The secondary apertures 14 and 16 are oppositely disposed along the length of the core 10 such that the central axis of the apertures 14 and 16 is transverse with respect to the longitudinal axis of the core 10. The discrete portion of core 10 may be considered as being the material immediately adjacent and intermediate the secondary apertures 14 and 16. The secondary apertures 14 and 16 may be centrally located as is shown by the cross section of core 10 illustrated in FIG. 1*b*, or may be offset with respect to the longitudinal axis of core 10 as is shown by the cross section of core 10 illustrated in FIG. 1*c*. A first conductor W is provided which couples all the material of core 10 and is threaded through the main aperture 12. A second conductor B is provided which couples the discrete portion of the core 10 along its length and is threaded through both the secondary apertures 14 and 16. The first conductor W has one end connected to ground and the other end connected to a read-reset pulse generator 18 and a word pulse generator 20. The second conductor B has one end connected to a double-pole switching means 22 and the other end connected to a similar switching means 24. The switch 22 is operative to connect the winding B either to ground or a bit pulse generator 26, while the switch 24 is operative to connect the winding B to ground or a load 28. In operation, the switches 22 and 24 are interconnected such that when the switch 22 connects the conductor B to generator 26, the switch 24 connects the conductor B to ground, and when the switch 24 connects the load 28 to the conductor B, the switch 22 connects the conductor B to ground.

Figure 2A:
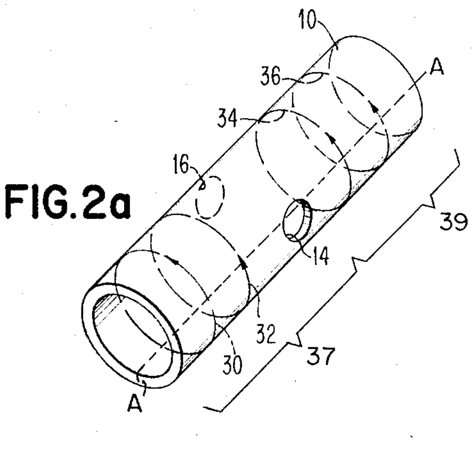

In operation, the generator 18 is first activated to energize the conductor W with a negative impulse of such a magnitude as to establish the core in a normal datum remanent orientation stable state as illustrated in FIG. 2*a*. Referring to FIG. 2*a*, a fair representation of the remanent flux distribution in the core 10 is illustrated by arrowed lines 30, 32, 34, and 36. For ease of presentation, whenever the winding W is energized by the generator 18 to establish the core 10 in the datum state of FIG. 2*a*, this operation will hereinafter be referred to as "read out" of the core 10.

With the core 10 in the datum state, if the generator 20 is activated, the winding W is energized by a positive current impulse to apply a magnetic field directed about the circumference of the core 10, and being in opposition to the remanent flux orientation as defined by lines 30–36. The magnitude of the current impulse from generator 20 is controlled such that the magnitude of the field applied to the core 10 is of insufficient magnitude, of and by itself, to cause a total irreversible change in the remanent magnetization of the core as shown in FIG. 2*a*. As will be discussed subsequently, in practice, this magnetic field does cause a slight amount of irreversible flux change, but for the purposes of presentation the change will be disregarded. Thus, upon termination of the pulse from the word pulse generator 20, the core 10 remains remanently magnetized as is shown in FIG. 2*a*.

Figure 2B:
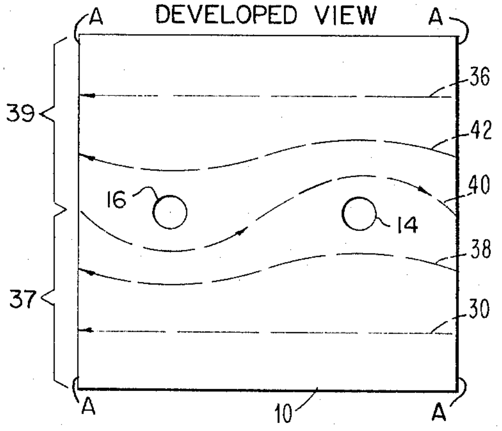

Assume that the switches 22 and 24 are positioned such as to connect one end of the winding B to generator 26 and the other end to ground and that the generator 26 is activated. The conductor B is energized by the generator 26 by a positive impulse. The conductor B may be considered as coupling a discrete portion of the core 10 along its longitudinal axis and as such to apply a magnetic field to the core 10, when energized, which is directed about the secondary apertures 14 and 16 of the core. The energized winding B applies a clockwise field to the material of the core 10 immediately adjacent the aperture 14. The clockwise field is clockwise when viewing aperture 14 of the core 10 in FIG. 2*a* and it is clockwise when viewing the aperture 14 of the core 10 in FIG. 2*b*, which is a developed view of the core 10 opened along line A, as indicated in FIG. 2*a*. However, it should be noted that since FIG. 2*b* is a developed view of the magnetic field about aperture 16 of core 10 in FIG. 2*b* is counter clockwise. For ease of presentation, one portion 37 of the core 10 adjacent similar sides of the apertures 14 and 16 will be referred to as the left portion 37 of the core 10, while the other portion 39 of the core 10 adjacent the opposite sides of apertures 14 and 16 will be referred to as the right portion 39 of the core 10. With respect to the left portion 37 of core 10, the magnetic field applied by energized winding B will aid the remanent flux in the material adjacent aperture 14 and therefore further saturates the material, while the material adjacent the aperture 16 will experience a field tending to switch the remanent flux orientation to an opposite state. With respect to the right portion 39 of the core 10, the material adjacent aperture 14 will experience a field tending to switch the remanent flux orientation to an opposite state while the material adjacent aperture 16 will experience a field directed to further saturate the material in the direction of remanent flux orientation already established. The current impulse provided by generator 26 is, however, controlled so that the magnitude of the field provided to the core 10 by conductor B is insufficient, of and by itself, to cause any appreciable change in the remanent magnetization of the core. Again, it should be understood that in practice, as will be described subsequently, a slight amount of flux is switched, but for the purposes of presentation will be disregarded.

Assume that the core 10 is remanently magnetized as is shown in FIG. 2*a* and both the generators 20 and 26 are operated to coincidently energize the conductors W and B, respectively. With respect to the left portion 37 of core 10, adjacent aperture 14, the magnetic field provided by energization of the conductor W opposes the magnetic field provided by energization of the conductor B, while adjacent the aperture 16, the magnetic field provided by energization of the conductor W adds to the magnetic field provided by energization of the conductor B. With respect to the right portion 39 of core 10, adjacent the aperture 14, the magnetic field provided by energization of the conductor W adds to the magnetic field provided by energization of the conductor B, while adjacent the aperture 16 the magnetic field provided by energization of the conductor W opposes the magnetic field provided by energization of the conductor B. Thus, the fields provided by energization of the conductors W and B cancel in the left portion 37 of the core 10 adjacent the aperture 14 and in the right portion 39 of the core 10 adjacent the aperture 16. These fields add in the right portion 39 of the core 10 adjacent the aperture 14 and in the left portion of the core 10 adjacent the aperture 16. Where these fields add, the magnetization of the material is irreversibly switched and the remanent flux distribution is as is shown in FIG. 2*b* which is arbitrarily designated as a stored binary "1."

As may be seen with reference to FIG. 2*b*, which is a developed view of the core 10, the remanent flux distribution in core 10 is altered from that of FIG. 2*a* in that the material adjacent aperture 14 of the right portion 39 of the core 10 and the material adjacent aperture 16 of the left portion 37 of the core 10 are oppositely magnetized, with respect to the direction of magnetization indicated by lines 30–36 in FIG. 2*a*, defining a flux distribution as illustrated in FIG. 2*b* by arrowed lines 30, 36, 38, 40, and 42. The flux distribution is seen to remain the same with respect to lines 30 and 36 but now the flux is seen to take on a bent-type configuration as is shown by lines 38 and 42 and a kinked shape as is illustrated by line 40 which links the material switched adjacent the apertures 14 and 16. It should be noted that with coincident application of the applied magnetic fields that the portion of the core 10 intermediate the apertures 14 and 16 contains a remanent flux distribution line 40 indicating that this portion of the core 10 undergoes an irreversible flux change.

Whenever the core 10 is read out, the switches 22 and 24 are controlled to connect conductor B to ground and the load 28, respectively. Assume the core 10 has a stored binary "1" FIG. 2*b*, and the core 10 is read out to establish the datum state as illustrated in FIG. 2*a*. With the core 10 having a stored binary "1," upon read out, a flux change takes place within the core and both the material adjacent aperture 14 of the right portion 39 of the core 10 and both the material adjacent aperture 16 of the left portion 37 of the core 10 are switched to cause an irreversible flux change in the material immediate the apertures 14 and 16 linked by the conductor B and, hence, induce a voltage thereon indicative of the flux change.

Figure 3:
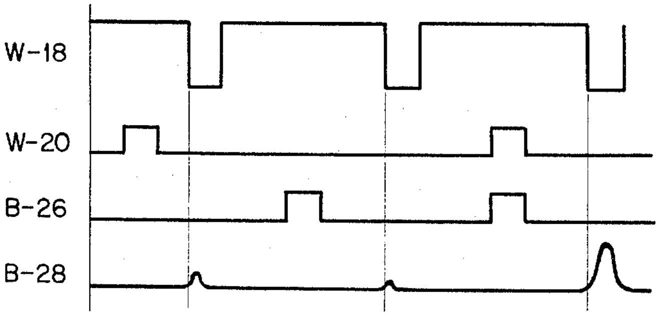
FIG. 3 is a pulse program for operation of the circuit of FIG. 1*a* or a memory of FIG. 4.

Referring to FIG. 3, a pulse program applied by the different generators 18, 20, and 26 is shown along with the output voltages induced on the conductor B during a read out operation for the different fields applied. A first pulse program, labelled W–18 is illustrated for energization of conductor W by generator 18. A second pulse program labelled W–20 is illustrated for energization of the conductor W by generator 20 while similarly a third pulse program is shown labelled B–26 for energization of the conductor B by generator 26. An output pulse pattern is also illustrated and labelled B–28 representing the voltage induced on the winding B when connected to the load 28 during read out of core 10. As may be seen, if the conductor W is energized by the generator 20, an output signal is induced on the conductor B during read out which is positive, having a given magnitude. If only the conductor B is energized by a B–26 pulse, then a signal is induced on the conductor B during read out of core 10 which is much smaller than the given magnitude of the output signal previously provided by energization of only conductor W. When conductors W and B are coincidently energized, then an output signal is induced on the conductor B during read out of core 10 whose magnitude is much greater than the given magnitude of the output signal provided during read out when only the conductor W is energized. In practice, the ratio of the magnitude of the signal induced on the conductor B during read out of core 10 after coincident energization of conductors W and B as compared with the magnitude of the signal induced in conductor B after energization of the conductor W only has been found to be 10:1 or better.

Figure 4:
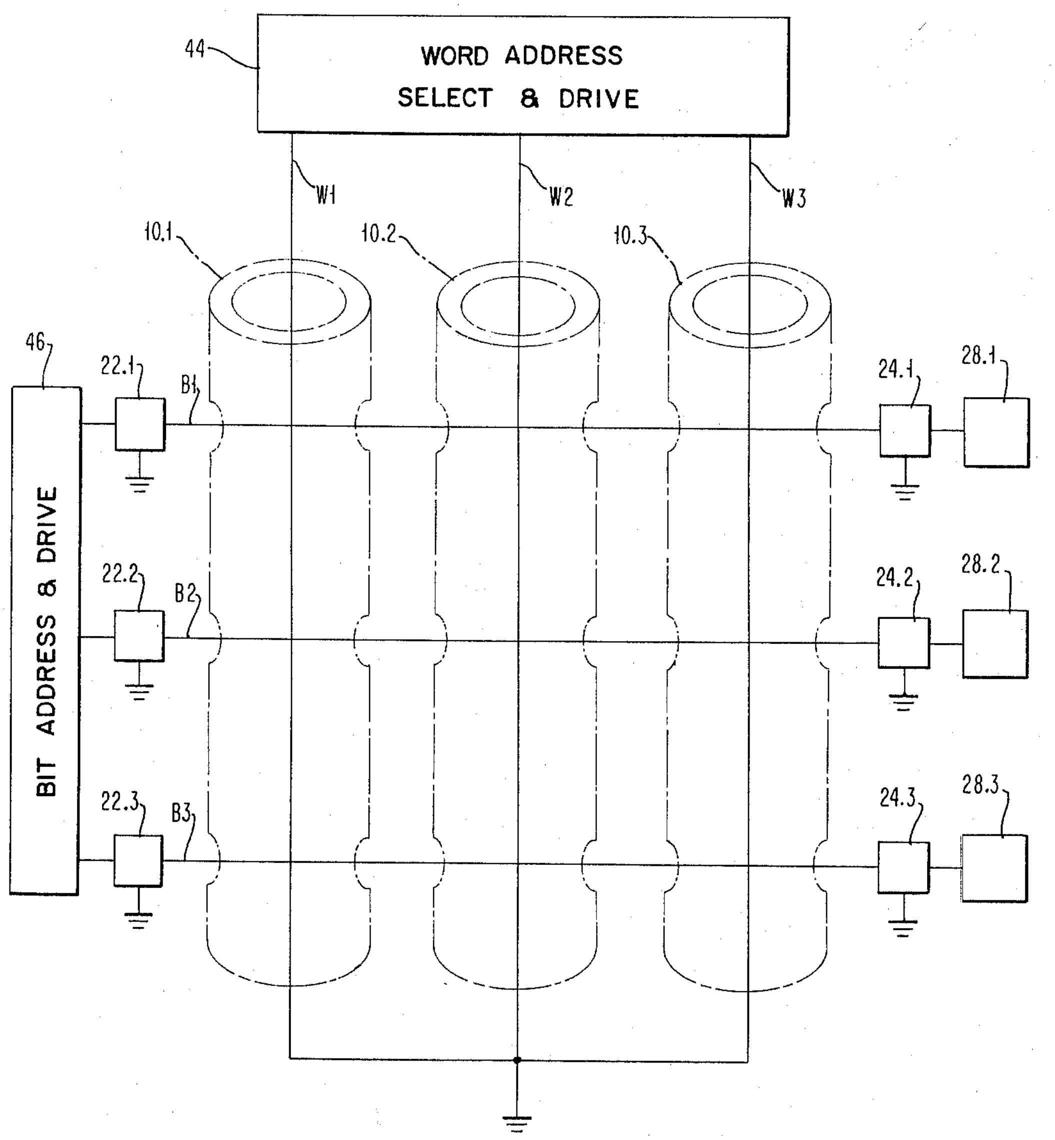
FIG. 4 is a memory according to another embodiment of this invention.

Referring now to FIG. 4, a magnetic memory according to this invention is schematically illustrated. The memory is word organized having a plurality of word column conductors W1–W3 and a plurality of bit row conductors B1–B3. Associated with each word conductor W1–W3 is a tubular shaped core 10.1–10.3, respectively, with each core 10.1–10.3 surrounding each of the respective word conductors W1–W3. Along the length of each tubular core 10.1–10.3 is a plurality of separated secondary apertures arranged in pairs similar to the secondary apertures 14 and 16 shown in FIG. 1*a*. Each bit row conductor couples a different portion of each tubular core 10.1–10.3 along its length. The word column conductors have one end connected to ground while the other end is connected to a word address and drive means 44 capable of providing address selection of a particular word line W1–W3 and the pulse generation corresponding to generators 18 and 20 of FIG. 1*a*. The bit row conductors B1–B3 are connected to a bit address and drive means 46 through a respective switch 22.1–22.3 and are further connected to utilization loads 28.1–28.3 through switches 24.1–24.3, respectively. The means 46 provides the function of bit addressing and pulse generation corresponding to the generator 26 of FIG. 1*a*, while each switch 22.1–22.3 corresponds to the switches 22 and each switch 24.1–24.3 corresponds to the switch 24 of FIG. 1*a*. Operation of this memory is similar to operation of the device of FIG. 1*a*. During the write time of the memory cycle a particular word line W1–W3 is energized and coincidently therewith those bit row conductors B1–B3 are energized when a binary "1" is to be stored in a particular bit position. For those bit positions of cores 10.1–10.3 in which the corresponding word conductor is not energized there is no appreciable irreversible flux change in the material coupled by the bit row conductors B which are energized for storing a binary "1" in the particular storage positions along the selected one of cores 10.1–10.3. For read out, a selected word conductor W1–W3 is energized by a negative impulse while the switches 22 and 24 are conditioned to connect the utilization loads 28 to the row bit conductors B.

While the storage device shown in FIG. 1*a* employs the conductor B as both an information input conductor and an output conductor by positioning of switches 22 and 24, it should be understood that if desired a further conductor may be employed similar to the conductor B for manifestation of the output signal thereby eliminating the necessity of the switches 22 and 24. Further, although a word organized memory is illustrated in FIG. 4, it is also quite apparent to one versed in the art that a bit organized memory may be constructed by utilization of an inhibit conductor coupling each bit position defined by the pairs of secondary apertures along the length of the cores 10 for each plane.

In order to aid in understanding and practicing the invention and provide a starting place for one skilled in the art in fabrication of this invention, a set of specifications for one embodiment of this invention is given below. It should be understood, however, that no limitation should be construed since other component values may be employed with satisfactory operation.

With respect to the embodiment of FIG. 4, each core 10 may be made of T–55 material of the type disclosed in U.S. Patent No. 2,950,252 assigned to the assignee of this application. The core 10 may have an inside diameter of 0.068 inch and an outside diameter of 0.125 inch with an overall length of 0.8 inch. Dispersed along the length of the core, nine pairs of secondary apertures may be provided with each aperture having a diameter ranging from 0.0115 inch to 0.075 inch with approximately an equal amount of material between adjacent pairs of secondary apertures. The field applied to core 10 during read out may be 3 ampere turns, with ampere turns hereinafter abbreviated as AT, and this field may be applied for approximately one microsecond. The magnetic field applied by conductor W during the write portion of the memory cycle may be 0.54 AT for approximately one microsecond, while the field applied by the bit conductor B may be 0.3 AT for approximately three microseconds. Further, in order to experimentally find the minimum ratios between adjacent secondary apertures with respect to the diameter of core 10, a core having an inside diameter of 0.080 inch and an outside diameter of 0.115 inch was provided in which secondary apertures having a diameter of 0.015 inch are drilled. With the amount of material between secondary apertures at 0.005 inch or more, the signal-to-noise ratio of the output signal remains at approximately 3.5 to 1. When the material between adjacent apertures is reduced to 0.0033 inch, the signal-to-noise ratio reduced to approximately 2:1. Here, the field provided for read out was 0.9 AT for one microsecond while the field provided by energization of the W conductor during the write portion of the memory cycle was 0.54 AT at one microsecond. The field provided by the bit conductor was varied in each case to obtain the maximum signal-to-noise ratio.

While the invention has been particularly shown and described with reference to preferred embodiments thereof, it will be understood by those skilled in the art that various changes in form and details may be made therein without departing from the spirit and scope of the invention.

What is claimed is:

1. A storage device comprising:

(a) a magnetic medium capable of being established in a plurality of stable states of flux remanence, (b) means for establishing said medium in one of said plurality of stable states with flux remanence directed along a first flux path within a given plane, (c) means for establishing said medium in a second of said plurality of stable states with flux remanence directed along a second flux path without said given plane, and (d) means for sensing the stable states of said medium.

2. A storage device comprising:

(a) a magnetic medium capable of being established in a plurality of stable states of flux remanence, (b) means for producing in said medium a first magnetic field in a given direction to establish said medium in one of said stable states having flux remanence directed along a first flux path, (c) means, including means for producing in said medium a second magnetic field disposed at a substantial angle to said given direction, for establishing said medium in a second of said stable states having flux remanence directed along a second flux path, and (d) means for sensing the stable states of said medium.

3. A storage device comprising:

(a) a magnetic element made of material exhibiting a plurality of stable states of flux remanence, (b) means for passing a first current through said element in a given direction to establish said element in a first stable state of flux remanence disposed in a first path, (c) means for passing a second current through said element in a direction at an angle to that of said given direction to establish said element in a second stable state of flux remanence disposed in a second path different from said first path, and (d) means including a conductor disposed between said first and second paths for determining the stable state of said element.

4. A storage device comprising:

(a) a magnetic element made of material exhibiting a plurality of stable states of flux remanence, (b) means for passing a first current through said element in a given direction to establish said element in a first stable state of flux remanence disposed in a first path, (c) means for passing a second current through said element in a direction transverse to that of said given direction to establish said element in a second stable state of flux remanence disposed in a second path different from said first path when said first and second currents are concurrently passing through said element, and (d) means including a conductor disposed between said first and second paths for determining the stable state of said element.

5. A storage device as set forth in claim 4 wherein said magnetic element is a substantially tubular element.

6. A storage device comprising:

(a) a magnetic medium capable of being established in a plurality of stable states of flux remanence, (b) means for producing in said medium in a given direction a first magnetic field to establish said medium in one of said stable states having flux remanence in a closed flux path substantially in a plane without said given plane, (c) means for producing in said medium in a direction disposed at an angle to said given direction a second magnetic field to establish said medium in a second of said stable states, and (d) means for sensing the stable states of said medium.

7. A storage device as set forth in claim 6 wherein said second field producing means includes means for producing simultaneously a third magnetic field in said given direction and a fourth magnetic field orthogonal to said third magnetic field.

8. A storage device comprising:

(a) an elongated element made of magnetic material having a plurality of storage portions disposed along the longitudinal axis thereof, each of said portions capable of being established in a plurality of stable states of flux remanence, (b) means including an electrical conductor disposed within each of said storage portions for sensing the stable states of its associated storage portion, (c) means for producing in said element a first magnetic field to establish each of storage portions in one of said stable states having flux remanence parallel to said electrical conductors, and (d) means for producing in said element a second magnetic field to selectively establish each of portions in a second of said stable states having flux remanence at an angle to said electrical conductors.

9. A storage device as set forth in claim 8 wherein said sensing means further includes means for producing a magnetic field parallel to said electrical conductor.

10. A storage device comprising:

(a) an element made of magnetic material capable of being established in a plurality of stable states of flux remanence, (b) means including an electrical conductor disposed within said element for sensing the stable states of said element, (c) means for establishing said element in one of said plurality of stable states with flux remanence directed along a first closed flux path, said electrical conductor being disposed without said first closed flux path, and (d) means for establishing said element in a second of said plurality of stable states with flux remanence directed along a second closed flux path, said electrical conductor being disposed within said second closed flux path.

11. A storage device comprising:

(a) an element made of magnetic material capable of being established in a plurality of stable states of flux remanence, (b) means including an electrical conductor disposed within said element for sensing the stable states of said element, (c) means for establishing said element in one of said plurality of stable states with a magnetically closed remanent flux path without remanent flux linkage of said electrical conductor, and (d) means for establishing said element in a second of said plurality of stable states with a magnetically closed remanent flux path with remanent flux linkage of said electrical conductor.

References Cited by the Examiner

UNITED STATES PATENTS

| | | | |
|---|---|---|---|
| 3,004,243 | 10/1961 | Rossing et al. | 340—174 |
| 3,058,099 | 10/1962 | Williams | 340—174 |
| 3,071,756 | 1/1963 | Pugh | 340—174 |
| 3,134,964 | 5/1964 | Wanlass | 340—174 |
| 3,142,048 | 7/1964 | Smith | 340—174 |

BERNARD KONICK, *Primary Examiner.*

TERRELL W. FEARS, IRVING SRAGOW, *Examiners.*

J. MOFFITT, *Assistant Examiner.*